United States Patent
Huber et al.

(10) Patent No.: US 8,854,866 B2
(45) Date of Patent: Oct. 7, 2014

(54) IDENTIFICATION CIRCUIT AND METHOD FOR GENERATING AN IDENTIFICATION BIT

(75) Inventors: Peter Huber, Neubiberg (DE); Winfried Kamp, Munich (DE); Joel Hatsch, Holzkirchen (DE); Michel d'Argouges, Munich (DE); Siegmar Koeppe, Munich (DE); Thomas Kuenemund, Munich (DE)

(73) Assignee: Infineon Technologies AG, Neubiberg (DE)

( * ) Notice: Subject to any disclaimer, the term of this patent is extended or adjusted under 35 U.S.C. 154(b) by 288 days.

(21) Appl. No.: 13/163,131

(22) Filed: Jun. 17, 2011

(65) Prior Publication Data

US 2012/0020145 A1    Jan. 26, 2012

(30) Foreign Application Priority Data

Jun. 22, 2010    (DE) .................. 10 2010 024 622

(51) Int. Cl.
*G11C 11/00*    (2006.01)
*G06F 21/72*    (2013.01)
*H04L 9/08*    (2006.01)

(52) U.S. Cl.
CPC .............. *H04L 9/0866* (2013.01); *G06F 21/72* (2013.01)
USPC .......................................... 365/154

(58) Field of Classification Search
USPC ................................. 365/154–156
See application file for complete search history.

(56) References Cited

U.S. PATENT DOCUMENTS

2006/0262628 A1* 11/2006 Nii et al. .................. 365/226
2011/0103161 A1* 5/2011 Tuyls et al. .............. 365/189.16
2012/0066571 A1* 3/2012 Marinet ........................ 714/773

FOREIGN PATENT DOCUMENTS

WO    WO 2009024913 A2 *    2/2009    ............... G11C 7/10

OTHER PUBLICATIONS

Guajardo, Jorge, et al. "FPGA Intrinsic PUFs and Their Use for IP Protection", in Cryptographic Hardware and Embedded Systems—CHES 2007. Sep. 10-13, 2007, pp. 63-80.

* cited by examiner

*Primary Examiner* — Vanthu Nguyen
*Assistant Examiner* — Khamdan Alrobaie
(74) *Attorney, Agent, or Firm* — Murphy, Bilak & Homiller, PLLC (57) ABSTRACT

A semiconductor device includes an identification circuit. The identification circuit includes a memory cell which includes a first transistor having a first value of a switching characteristic and a second transistor having a second value of the switching characteristic. The identification circuit is operable to generate a memory-cell-specific identification bit which is dependent on production-dictated differences in the first switching characteristic of the first transistor and the second switching characteristic of the second transistor. The identification circuit further includes a drive circuit for the memory cell. The drive circuit is operable to connect or isolate an upper supply potential and a lower supply potential of the semiconductor device to or from the memory cell independently of one another.

15 Claims, 6 Drawing Sheets

IDENTIFICATION CIRCUIT AND METHOD FOR GENERATING AN IDENTIFICATION BIT

PRIORITY CLAIM

This application claims priority to German Patent Application No. 10 2010 024 622.0 filed on 22 Jun. 2010, the content of said application incorporated herein by reference in its entirety.

TECHNICAL FIELD

The present application relates to a semiconductor device having an identification circuit, and to a method for generating an identification bit by a semiconductor device.

BACKGROUND

For the purpose of generating an identification bit or an identification code composed of a plurality of identification bits within a semiconductor device, various so-called "physical unclonable functions" (PUF) within the semiconductor device have been proposed. PUFs can be circuits, components, processes or other physical systems in a device which make it possible to obtain in a reproducible manner an individual unclonable identification code consisting of a plurality of identification bits. The identification code can always and repeatedly be derived from the inherent properties of the device and does not have to be stored, which constitutes a significant gain in security against external attacks. PUFs are based on fluctuations in the production process, material fluctuations or the like and cannot be set in a targeted manner during production. The bandwidth of the fluctuations and the number of identification bits used ensure that each device in a series acquires an individual identification code.

The identification codes obtained from the PUFs can be used, inter alia, for cryptographic calculations or encryptions or simply just for the identification of devices. The use of PUFs makes it possible, for example, to increase the security for computers, telephones, smart cards, RFID tags or similar devices.

PUFs make it possible, for example, to generate a unique identification identifier, a so-called identification code, for integrated circuits (ICs). This is done, for example, by a process in which existing random differences in MOS transistor threshold voltages or other properties that determine the electronic behavior are compared in a suitable manner. Since the PUFs are based on fluctuations in the production process, they cannot be controlled even by the IC manufacturer.

For methods for the commercially usable utilization of random process variables, typically at least some of the properties explained below are fulfilled.

Firstly, the PUF circuit typically supplies a digital output value present in the form of a binary identification code.

Furthermore, the identification code should be reproducible and stable with regard to variations in supply voltage, temperature, ageing and relative to all types of noise (thermal, shot noise, flicker noise, generation-recombination noise, etc.).

The identification code length and stability are typically chosen such that every IC can be correctly identified with a sufficiently high probability.

The PUF circuit should furthermore consume as little energy as possible and require as far as possible no calibration.

PUF circuits in ICs based on SRAM cell arrays are known in the literature. For example, a PUF circuit based on SRAM cells is described in "FPGA Intrinsic PUFs and Their Use for IP Protection", in Cryptographic Hardware and Embedded Systems—CHES 2007, J. Guajardo, S. S. Kumar, G.-J. Schrijen, and P. Tuyls, ser. LNCS, P. Paillier and I. Verbauwhede, Eds., vol. 4727, Springer, Sep. 10-13, 2007, pp. 63-80. The fluctuations in the production process here provide for a different doping of the transistors in the channel region, and these in turn provide for different threshold voltages of the transistors within an SRAM cell. When a supply voltage is applied to the IC and thus to the SRAM cells, the latter switch over to a basic setting dependent on the threshold voltage of the transistors. The basic setting of each individual SRAM cell is independent of the basic setting of the other SRAM cells and supplies an identification bit. If various SRAM cells are then combined to form a block, an identification code can be generated from the interconnected SRAM cells and their identification bits.

One disadvantage of this known approach for realizing a PUF is that the PUF and thus the identification code can be generated only during the switch-on operation. The entire IC or at least the entire SRAM therefore first has to be switched to be free of voltage in order subsequently to be able to generate the identification code upon switch-on. If, during the operation of the IC, an identification code then has to be generated, for example for the purpose of authentication, this can lead to problems or to losses of time.

SUMMARY

Embodiments described herein provide an identification circuit and a method for generating an identification bit in a semiconductor device, where a PUF-based identification bit is generated in a simpler manner.

In one exemplary embodiment, the identification circuit includes a memory cell, including a first transistor having a first value of a switching characteristic and a second transistor having a second value of the switching characteristic. The memory cell is embodied in such a way that a memory-cell-specific identification bit can be generated in a manner dependent on the production-dictated differences in the first switching characteristic of the first transistor and the second switching characteristic of the second transistor. Furthermore, a drive circuit for the memory cell is provided. The drive circuit is operable to connect or isolate an upper supply potential and a lower supply potential of the semiconductor device to or from the memory cell independently of one another.

The circuit explained above makes it possible to drive memory cells in a targeted manner and thus to generate PUF-based identification codes at any desired time, without the semiconductor device having to be switched to have zero voltage beforehand.

In one exemplary embodiment, the memory cell can be an SRAM cell. SRAM cells are available on most ICs, such that this does not necessitate additional circuit elements on the semiconductor device. The advantage of the multiple synergistic usability of the SRAM cells is afforded not only for the realization of PUFs, but also for the customary use as static random access memories.

In a further embodiment of the above circuit, the drive circuit furthermore includes a pMOS transistor for controlling the upper supply potential of the memory cell and an nMOS transistor for controlling the lower supply potential of the memory cell.

In a further embodiment, the drive circuit furthermore includes a pull-down transistor for connecting the upper supply potential of the memory cell to the lower supply potential.

If two or more identification circuits are interconnected, then the respectively associated memory-cell-specific identification bits form an individual identification code. For most applications it suffices to provide an interconnection of 1024 identification circuits. From such an interconnection it is possible to generate 256-bit identification codes, for example, which are sufficient for most security applications. Depending on the application however, it is also possible to generate shorter or longer identification codes.

The semiconductor device can furthermore include a cryptographic module, where the cryptographic module is embodied in such a way that a cryptographic algorithm processed by the cryptographic module is based on the identification code generated by the identification circuits.

According to an embodiment of method for generating an identification bit by means of a semiconductor device, the method includes setting a defined precharge state of a memory cell and driving the memory cell such that a memory-cell-specific identification bit is generated in a manner dependent on the production-dictated differences in the first switching characteristic of the first transistor and the second switching characteristic of the second transistor.

The possibility of setting a defined precharge state of the memory cell makes it possible to rapidly generate a PUF-based identification bit from the memory cell. Therefore, it is no longer necessary to switch the entire semiconductor device to be free of voltage.

By way of example, driving the memory cell can be effected by bringing about a defined precharge state corresponding to no valid datum of the memory cell. In other words, in the memory cell a precharge state is constrained which does not occur in the regular memory state, in which a logic value 0 or 1 is stored in the memory cell. On the basis of such a defined state of the memory cell, the memory-cell-specific identification bit can subsequently be generated.

Bringing about the defined precharge state can be effected by applying a positive potential to a first bit line of the memory cell and a second bit line of the memory cell. After activating a word line of the memory cell, it is subsequently possible to generate the memory-cell-specific identification bit on the basis of the state of the memory cell.

In methods with low requirements made of security, for example, it is possible to store the generated identification bit in the memory cell. The identification bit therefore does not have to be generated anew each time. This provides for a higher method speed since the generated identification bit can be read directly from the memory cell.

If the generated identification bit is not stored in the memory cell, then the abovementioned method steps can also be performed multiply in order to generate the identification bit.

According to another embodiment of a method, the voltage supply of the memory cell can be controlled independently of that of the semiconductor device, such that the supply potentials (VDD, VSS) of the semiconductor device can remain constant.

Furthermore, it is possible to interconnect the identification bits of two or more memory cells to form an identification code. The identification code thus generated can then be used for cryptographic applications, for example.

Those skilled in the art will recognize additional features and advantages upon reading the following detailed description, and upon viewing the accompanying drawings.

BRIEF DESCRIPTION OF THE FIGURES

The elements of the drawings are not necessarily to scale relative to each other. Like reference numerals designate corresponding similar parts. The features of the various illustrated embodiments can be combined unless they exclude each other. Embodiments are depicted in the drawings and are detailed in the description which follows.

DETAILED DESCRIPTION

Figure 1:
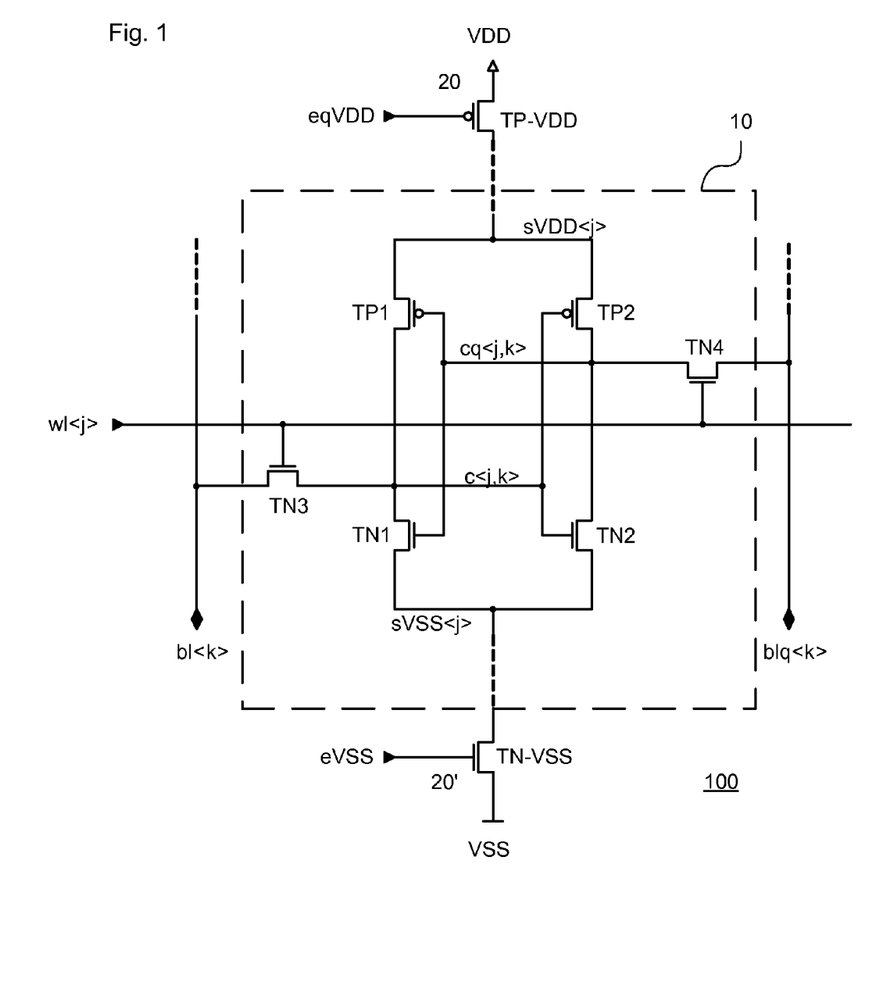
FIG. 1 shows an exemplary embodiment of an identification circuit.

FIG. 1 illustrates a first exemplary embodiment of an identification circuit 100. The circuit 100 includes nMOS transistors TN1, TN2, TN3 and TN4 and pMOS transistors TP1 and TP2, which correspond to a traditional 6-transistor SRAM cell 10. In contrast to known memory circuits, the identification circuit 100 has an upper supply potential sVDD<j> that can be switched via the pMOS transistor TP-VDD and a lower supply potential sVSS<j> that can be switched via the nMOS transistor TN-VSS. In this case, the indices j in wl<j> and k in bl<k> and blq<k> are intended to indicate that this exemplary embodiment involves a cell array comprising J word lines wl<j>, j=0, 1, . . . , J−1 and K bit line pairs bl/blq<k>, k=0, 1, . . . , K−1, that is to say a total of J*K memory cells 10, where all cells assigned to a word line can respectively have a common sVDD<j> and sVSS<j>.

Figure 2:
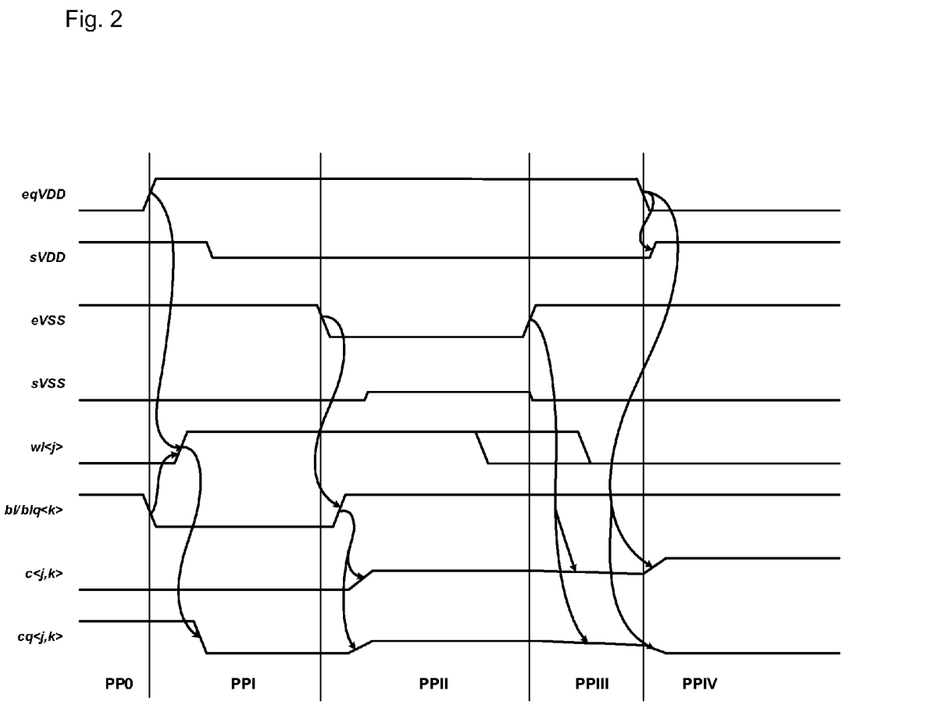
FIG. 2 shows a first illustration of the signal profiles of the exemplary embodiment of FIG. 1.

FIG. 2 shows a first illustration of the signal profiles of the first exemplary embodiment of the identification circuit 100. The signal profiles of all the relevant nodes for generating the identification bit by the circuit 100 from FIG. 1 are illustrated in this case.

The signal profiles of eqVDD, eVSS, wl<j> and bl/blq<k> and the mutual dependencies thereof can be generated, in exemplary embodiments by suitable peripheral circuits outside the memory cell 10. Moreover, in the exemplary embodiment shown, the logical binary value 0 is physically represented by the lower supply potential VSS and the logical binary value 1 is physically represented by the upper supply potential VDD, but other modes of representing logic states are also possible.

The starting point is the precharge state of the memory cell 10, designated by PP0 in FIG. 2. In PP0, eqVDD is at 0 and eVSS is at 1. Owing to eqVDD=0 and eVSS=1, sVDD is conductively connected to VDD via pMOS transistor TP-VDD, and sVSS is conductively connected to VSS via nMOS transistor TN-VSS. In the case of a plurality of memory cells 10, wl<j>=0 holds true for all the word lines. Thus, the nMOS transistors TN3 and TN4 of all the memory cells 10 are turned off, that is to say that they are switched to a high impedance state. As a result, all the memory cells 10 are isolated from the bit lines bl/blq<k>, the bit lines bl/blq<k> being in their precharge state bl<k>=blq<k>=1.

The first phase PPI of the generation of the identification bit begins with the signal changes eqVDD->1 and bl=blq->0. Afterward, all the word lines are activated, that is to say that wl<j>=1 for a selected or for all j, such that, in all the memory cells 10, the memory cell nodes c<j,k> and cq<j,k> are conductively connected to the corresponding bit lines bl<k> and blq<k> via TN3 and TN4, respectively, which in turn has the consequence that c<j,k>=cq<j,k>=0 holds true for the memory cell nodes. As a consequence thereof, the level of sVDD falls to approximately the absolute value of a pMOS threshold voltage |VthTP1| or |VthTP2|. At this juncture the state c<j,k>=cq<j,k>=0 driven in the memory cells is a state which does not occur when storing logic states in the memory cell, since only complementary values for c<j,k> and cq<j,k> occur there. The state c<j,k>=cq<j,k>=0 generated in the memory cell at the memory cell nodes is furthermore a defined state, that is to say, for each memory cell, a defined or predetermined potential is generated or driven at the respective nodes c<j,k>=cq<j,k>, the identification bits thereupon being generated on the basis of this state. In this case the precharge state or the potential at the nodes is driven or constrained independently of the manufacturing fluctuations of the individual circuit elements. In exemplary embodiments, by way of example, all the memory cells of an arrangement can be put into the state c<j,k>=cq<j,k>=0, individual PUF identification bits being generated from the memory cells 10 in accordance with the method described below. This can furthermore be effected selectively for each memory cell 10.

In contrast thereto, in known methods wherein the entire SRAM device is switched to be free of voltage, no defined state is generated in the memory cell itself or at the nodes of the memory cell.

The second phase PPII of the generation of the identification bit begins with the turn-off of nMOS transistor TN-VSS on account of the signal change eVSS->0. This is followed by rising edges bl<k>=blq<k>->1 of all the bit line pairs, which firstly has the consequence that the memory cells nodes are raised to a level of VDD minus approximately an nMOS threshold voltage: c<j,k>->VDD-VthTN3, cq<j,k>->VDD-VthTN4. Depending on the randomly and statistically independently distributed differences in the threshold voltages and/or other parameters that determine the electronic behavior of the nMOS transistors TN3 and TN4, such as e.g. channel lengths and widths and also charge carrier mobilities, c<j,k> and cq<j,k> attain different levels at the end of PPII. The potential of sVSS rises somewhat as a consequence of the charge flowing to sVSS from the cell nodes via TN1 and TN2.

The third phase PPIII of the generation of the identification bit begins with the switch-on of the nMOS transistor TN-VSS as a consequence of the signal change eVSS->1. As a result, sVSS falls again to VSS, and the levels of c<j,k> and cq<j,k> both fall, although generally with different temporal gradients and to different values at the end of PPIII, depending on the randomly and statistically independently distributed production-dictated variations of the threshold voltages and other parameters that determine the electronic behavior of the nMOS transistors TN3 and TN4 and also TN1 and TN2. The word lines wl<j> are deactivated either in PPII or in PPIII, i.e. wl<j>->0, as illustrated in FIG. 2.

The fourth phase PPIV of the generation of the identification bit begins with the switch-on of pMOS transistor TP-VDD as a consequence of the signal change epVDD->0. As a result, sVDD rises again to VDD, as a result of which the feedback within the memory cell 10 is switched on again. This in turn has the consequence that c<j,k> and cq<j,k> are switched to full levels VDD and VSS, respectively, depending on their relative level attained at the end of PPIII or, if appropriate, depending on the randomly and statistically independently distributed variations of the threshold voltages and other parameters that determine the electronic behavior of the pMOS transistors TP1 and TP2.

In the phase PPIV, the peripheral circuit driving the memory cell 10 assumes a state identical to that in PP0. In this case, the content of the memory cell 10 can be different than the content in the phase PP0. If a plurality of memory cells 10 were then driven, all supply random, statistically independently distributed and IC-specific binary states, the identification bits, which in combination yield an identification code. The randomness of each individual identification bit is based on the random and statistically independently distributed variation of the threshold voltages and other parameters that determine the electronic behavior of the nMOS transistors TN3 and TN4, TN1 and TN2, and of the pMOS transistors TP1 and TP2, such as e.g. the channel lengths and widths and also the charge carrier mobilities.

The method described above thus constitutes an exemplary embodiment where firstly a defined precharge state of a memory cell is set, and the memory cell is thereupon driven such that a memory-cell-specific identification bit is generated in a manner dependent on the production-dictated differences in the first switching characteristic of the first transistor and the second switching characteristic of the second transistor.

The use of other memory cells is not adversely affected by the method described above, that is to say that if other memory cells in the memory arrangement store logical and useful data states, the storage of these useful data in the other memory cells is not adversely affected, since the memory cells can be used individually or selectively for determining the PUF identification bits.

Figure 3:
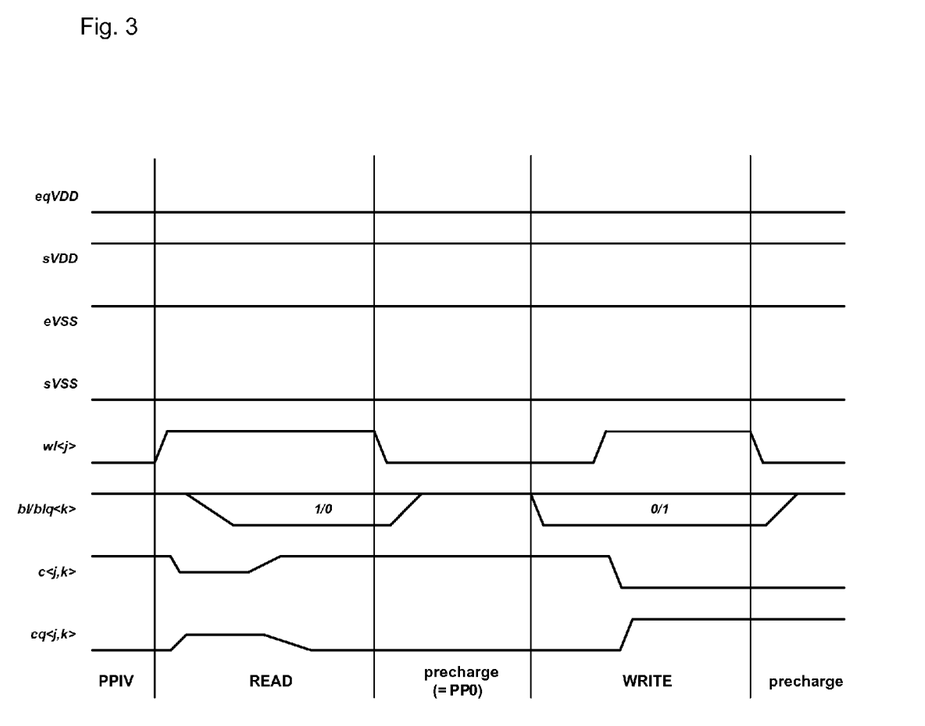
FIG. 3 shows an illustration of the signal profiles of the exemplary embodiment of FIG. 1.

FIG. 3 shows an illustration of signal profiles for reading out the identification bit from the first exemplary embodiment of the identification circuit 100. The identification bits generated by the circuit 100 of FIG. 1 can then be read out from the memory cell 10 in a known manner, as illustrated in FIG. 3. FIG. 3 thus follows the signal profiles presented in FIG. 2 and shows the temporal signal profiles for conventionally reading from and writing to a memory cell 10. If the memory cell 10 is no longer required for the generation of an identification bit, it can be used as a conventional static random access memory if the memory cell 10 is an SRAM cell, for example.

Figure 4:
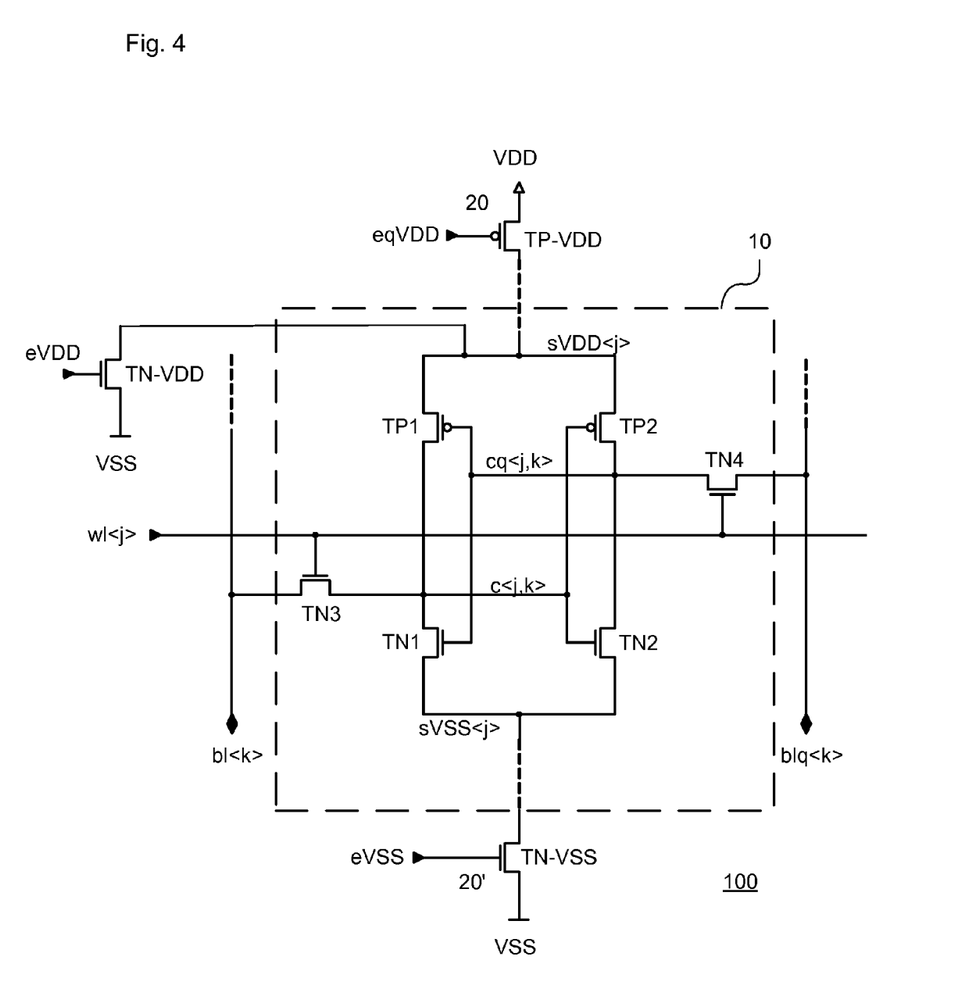
FIG. 4 shows a further exemplary embodiment of an identification circuit.

FIG. 4 shows a second exemplary embodiment of an identification circuit 100. In comparison with the exemplary embodiment from FIG. 1, an additional nMOS pull-down transistor TN-VDD is provided for connecting the upper supply potential of the memory cell sVDD<j> to the lower supply potential VSS. The nMOS transistor TN-VDD enables the rapid discharge of sVDD<j> to VSS.

The generation of an identification bit involves firstly setting the signals eqVDD to 0 (active), eVSS to 1 (active) and eVDD to 0 (non-active). The bit lines bl<k> and blq<k> are pulled to VSS. Afterward, eqVDD is set to 1, such that the pMOS transistor TP-VDD interrupts the connection of VDD to sVDD<j>. Independently thereof, eVSS is set to 0, such that nMOS transistor TN-VSS isolates the connection of VSS to sVSS<j>. The nMOS pull-down transistor TN-VDD is then activated temporarily in order to pull sVDD<j> to VSS.

In a next step, the word line wl<j> is set to VDD. The two memory nodes c<j,k> and cq<j,k> are thus pulled to the potential VSS present at the bit lines bl<k> and blq<k>. Afterward, the word line wl<j> is deactivated again. Through capacitive coupling via the transistors TN3 and TN4, the memory nodes c<j,k> and cq<j,k> are discharged to a potential below VSS. This results in an advantageous overdriving of the transistors TP1 and TP2 as soon as the transistor TP- VDD is switched on by the setting of eqVDD to 0 and the cross-coupling of the transistors TP1 and TP2 in the memory cell 10 is activated. The differences resulting from the production methods for the transistors TP1 and TP2 cause the memory cell 10 to switch over in a preferred direction as soon as eVSS->1 and hence sVSS<j>->0. The identification bit can then be read out via the bit lines bl<k> and blq<k>.

Figure 5:
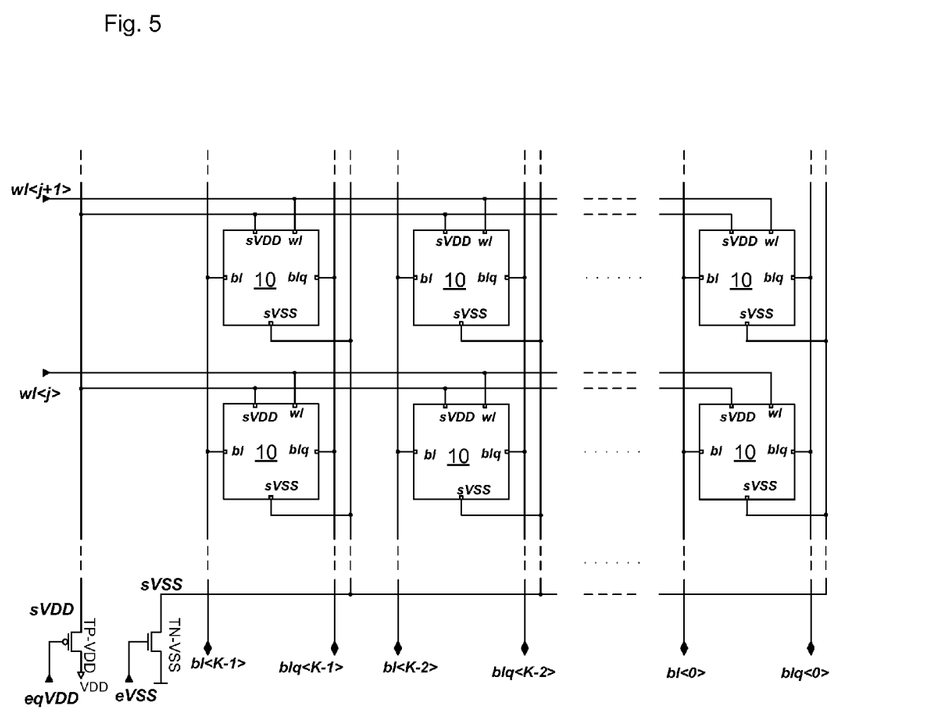
FIG. 5 shows an exemplary embodiment of an arrangement of identification circuits.

FIG. 5 shows a first exemplary embodiment of an arrangement of identification circuits 100. In this exemplary embodiment, two or more memory cells 10 are driven simultaneously, where a single pair of switchable supply potentials sVDD, sVSS and switching signals eqVDD, eVSS is provided for the entire array thus defined. In the exemplary embodiment shown in FIG. 5, the sVDD wirings run parallel to the word lines, while the sVSS wirings are laid perpendicularly to the word lines. In a further exemplary embodiment, the sVDD and sVSS wirings can also be wired oppositely, i.e. in a manner rotated by 90°, or both can run perpendicular to the word lines. In this exemplary embodiment, all the memory cells of the array, for the purpose of generating respective identification bits by means of the switching of the two transistors TP-VDD and TN-VSS, can be put jointly into the defined state.

Figure 6:
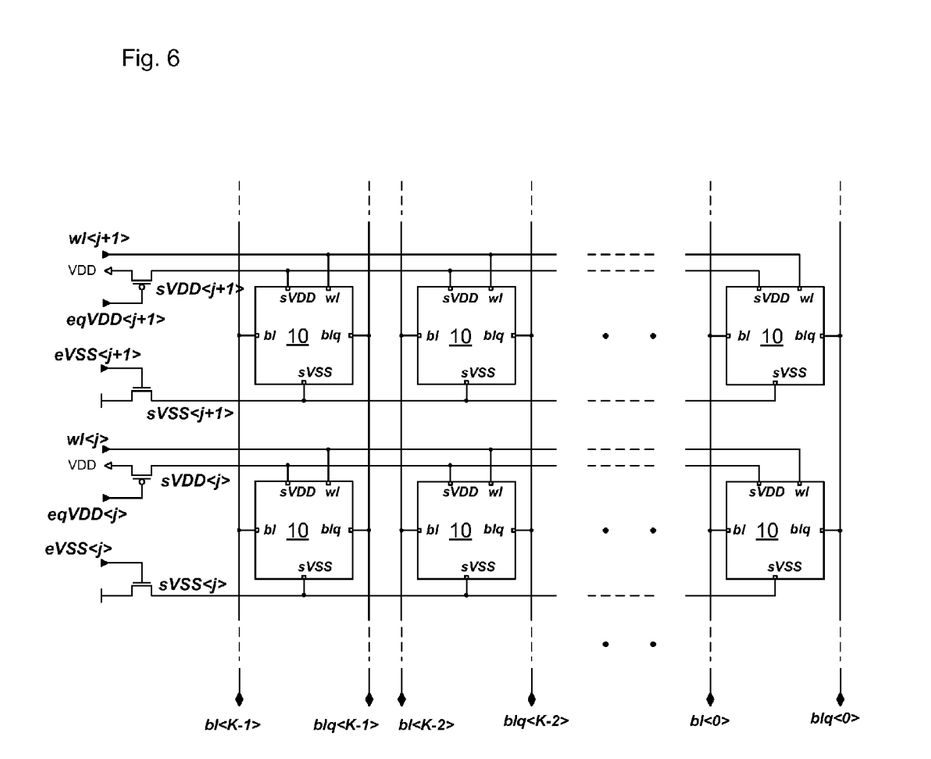
FIG. 6 shows an exemplary embodiment of an arrangement of identification circuits.

FIG. 6 shows a second exemplary embodiment of an arrangement of identification circuits 100. In this exemplary embodiment, the memory cells 10 are driven in a word-oriented manner, wherein for each word j assigned to a word line wl<j>, consisting of K bits and correspondingly K bit line pairs bl<K−1:0>, blq<K−1:0>, a dedicated pair of switchable supply potentials sVDD<j>, sVSS<j> and switching signals eqVDD<j>, eVSS<j> is also provided. The physical wiring of the sVDD<j>, sVSS<j> can in this case be effected in parallel with the word line wl<j>.

Generally, identification circuits 100 or arrays of identification circuits which can be driven independently of the others can be arranged in any desired number in a semiconductor device.

Terms such as "first", "second", and the like, are also used to describe various elements, regions, sections, etc. and are also not intended to be limiting. Like terms refer to like elements throughout the description.

As used herein, the terms "having", "containing", "including", "comprising" and the like are open ended terms that indicate the presence of stated elements or features, but do not preclude additional elements or features. The articles "a", "an" and "the" are intended to include the plural as well as the singular, unless the context clearly indicates otherwise.

It is to be understood that the features of the various embodiments described herein may be combined with each other, unless specifically noted otherwise.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A semiconductor device comprising an identification circuit, the identification circuit comprising:
   a memory cell including a first transistor having a first value of a switching characteristic and a second transistor having a second value of the switching characteristic, the identification circuit being operable to generate a memory-cell-specific identification bit that is dependent on production-dictated differences in the first switching characteristic of the first transistor and the second switching characteristic of the second transistor; and
   a drive circuit for the memory cell, which drive circuit is operable to connect or isolate an upper supply potential of the semiconductor device to or from the memory cell, and to connect or isolate a lower supply potential of the semiconductor device to or from the memory cell, independently from connecting or isolating the upper supply potential of the semiconductor device.

2. The semiconductor device as claimed in claim 1, wherein the memory cell is an SRAM memory cell.

3. The semiconductor device as claimed in claim 1, wherein the drive circuit comprises a pMOS transistor operable to control the upper supply potential of the memory cell and an nMOS transistor operable to control the lower supply potential.

4. The semiconductor device as claimed in claim 1, wherein the drive circuit comprises a transistor operable to connect the upper supply potential of the memory cell to the lower supply potential.

5. The semiconductor device as claimed in claim 1, wherein the identification circuit is a PUF circuit.

6. A semiconductor device comprising two or more identification circuits each of which comprises:
   a memory cell including a first transistor having a first value of a switching characteristic and a second transistor having a second value of the switching characteristic, the identification circuit being operable to generate a memory-cell-specific identification bit that is dependent on production-dictated differences in the first switching characteristic of the first transistor and the second switching characteristic of the second transistor;
   a drive circuit for the memory cell, the drive circuit being operable to connect or isolate an upper supply potential of the semiconductor device to or from the memory cell, and to connect or isolate a lower supply potential of the semiconductor device to or from the memory cell, independently from connecting or isolating the upper supply potential of the semiconductor device; and
   wherein the memory-cell-specific identification bit generated by each identification circuit together form an individual identification code.

7. The semiconductor device as claimed in claim 6, furthermore comprising a cryptographic module operable to process a cryptographic algorithm based on the identification code.

8. The semiconductor device as claimed in claim 6, wherein one or more the identification circuits is a PUF circuit.

9. A method for generating an identification bit by a semiconductor device, the method comprising:
   setting a defined precharge state of an SRAM memory cell including a first transistor having a first value of a switching characteristic and a second transistor having a second value of the switching characteristic, the defined precharge state being such that a combination of nodes of the memory cell are constrained to a precharge state that does not occur in a memory state in which a logic value 0 or 1 is stored in the SRAM memory cell; and
   driving the precharged memory cell so that a memory-cell-specific identification bit is generated dependent on production-dictated differences in the first switching characteristic of the first transistor and the second switching characteristic of the second transistor.

10. The method as claimed in claim 9, wherein driving the memory cell comprises:

writing a state corresponding to that of an invalid datum to the memory cell; and generating the memory-cell-specific identification bit based on the state of the memory cell.

11. The method as claimed in claim 9, wherein driving the memory cell comprises:

applying a positive potential to a first bit line of the memory cell and a second bit line of the memory cell;

activating a word line of the memory cell; and generating the memory-cell-specific identification bit based on the state of the memory cell.

12. The method as claimed in claim 9, further comprising storing the memory-cell-specific identification bit in the memory cell.

13. The method as claimed in claim 9, further comprising reading the memory-cell-specific identification bit from the memory cell.

14. The method as claimed in claim 9, wherein the defined precharge state of the memory cell is set and the memory cell driven a plurality of times to generate the memory-cell-specific identification bit.

15. The method as claimed in claim 9, wherein supply potentials of the semiconductor device are kept constant.

* * * * *